(12) United States Patent
Marpu et al.

(10) Patent No.: US 11,721,853 B2
(45) Date of Patent: Aug. 8, 2023

(54) ELECTRIFIED VEHICLE BATTERY PACKS WITH IMPROVED THERMAL INTERFACE MATERIAL DISTRIBUTION

(71) Applicant: FORD GLOBAL TECHNOLOGIES, LLC, Dearborn, MI (US)

(72) Inventors: Amar Marpu, Canton, MI (US); Patrick Daniel Maguire, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 30 days.

(21) Appl. No.: 17/348,847

(22) Filed: Jun. 16, 2021

(65) Prior Publication Data

US 2021/0313636 A1     Oct. 7, 2021

Related U.S. Application Data

(62) Division of application No. 15/977,485, filed on May 11, 2018, now Pat. No. 11,069,933.

(51) Int. Cl.
*H01M 10/6554*     (2014.01)
*H01M 10/625*     (2014.01)
(Continued)

(52) U.S. Cl.
CPC ..... *H01M 10/6554* (2015.04); *H01M 10/625* (2015.04); *H01M 50/227* (2021.01);
(Continued)

(58) Field of Classification Search
CPC ........... H01M 10/6554; H01M 10/625; H01M 10/613; H01M 10/653; H01M 10/6561; H01M 10/6567; H01M 50/20; H01M 50/202; H01M 50/204; H01M 50/207; H01M 50/209; H01M 50/211; H01M 50/213; H01M 50/216; H01M 50/218; H01M 50/22; H01M 50/222; H01M 50/224; H01M 50/227; H01M 50/229;
(Continued)

(56) References Cited

U.S. PATENT DOCUMENTS 5,626,982 A * 5/1997 Kawai .................. B32B 5/18
                                                                             428/318.6
9,786,966 B2     10/2017     Burrows et al.
(Continued)

FOREIGN PATENT DOCUMENTS

| JP | 2017168412 A | 9/2017 |
|----|--------------|--------|
| JP | 2018010753 A | 1/2018 |
| JP | 2018014251 A | 1/2018 |

*Primary Examiner* — Matthew W Van Oudenaren
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack assembly process may include supporting one or more components, such as a heat exchanger plate, of the battery pack against deflection during the assembly process. Supporting the heat exchanger plate to keep the plate relatively flat during the battery pack assembly process improves the flow distribution of a thermal interface material (TIM), thereby achieving improved TIM coverage and improved heat transfer between battery cells and the heat exchanger plate of the battery pack.

17 Claims, 5 Drawing Sheets

(51) Int. Cl.
*H01M 50/227* (2021.01)
*H01M 10/613* (2014.01)
*H01M 50/236* (2021.01)
*H01M 50/238* (2021.01)

(52) U.S. Cl.
CPC ........ *H01M 10/613* (2015.04); *H01M 50/236* (2021.01); *H01M 50/238* (2021.01); *H01M 2220/20* (2013.01)

(58) Field of Classification Search
CPC ............. H01M 50/231; H01M 50/233; H01M 50/236; H01M 50/238; H01M 50/24; H01M 50/242; H01M 50/244; H01M 50/247; H01M 50/249; H01M 50/251; H01M 50/253; H01M 50/278; H01M 50/28; H01M 50/282; H01M 50/284; H01M 50/287; H01M 50/289; H01M 50/291; H01M 50/293; H01M 50/296; H01M 50/298; H01M 2220/20; H01M 10/60–627; H01M 10/647; H01M 10/643; H01M 10/6552; H01M 10/6556; H01M 10/6557; H01M 10/6565; H01M 10/6568; B60L 50/64
See application file for complete search history.

(56) References Cited

U.S. PATENT DOCUMENTS

| | | | |
|---|---|---|---|
| 2008/0068803 A1* | 3/2008 | Chen | H01L 23/467 361/708 |
| 2008/0193830 A1 | 8/2008 | Buck et al. | |
| 2011/0258845 A1 | 10/2011 | Wells et al. | |
| 2013/0004822 A1 | 1/2013 | Hashimoto et al. | |
| 2013/0011713 A1* | 1/2013 | Harada | H01M 10/6557 429/120 |
| 2013/0034767 A1* | 2/2013 | Pentapati | H01M 10/6556 165/104.33 |
| 2013/0143074 A1 | 6/2013 | Kim | |
| 2014/0030576 A1 | 1/2014 | Schaefer et al. | |
| 2015/0357615 A1* | 12/2015 | Maguire | H01M 50/293 429/156 |
| 2016/0020496 A1* | 1/2016 | Burrows | B60L 1/02 429/62 |
| 2016/0118700 A1 | 4/2016 | Perumalla et al. | |
| 2016/0260950 A1* | 9/2016 | Baek | H01M 50/502 |
| 2017/0018824 A1 | 1/2017 | Maguire | |
| 2018/0026321 A1 | 1/2018 | Rhodes et al. | |

* cited by examiner

1

ELECTRIFIED VEHICLE BATTERY PACKS WITH IMPROVED THERMAL INTERFACE MATERIAL DISTRIBUTION

CROSS REFERENCE TO RELATED APPLICATION

This is a divisional of U.S. patent application Ser. No. 15/977,485, filed on May 11, 2018, the entire disclosure of which is incorporated herein by reference.

TECHNICAL FIELD

This disclosure relates to electrified vehicle battery packs, and more particularly to electrified vehicle battery packs that exhibit improved thermal interface material (TIM) distribution by supporting a heat exchanger plate of the battery pack during the assembly process.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of battery cells that store energy for powering these electrical loads. The battery cells generate heat during charging and discharging operations. This heat must be dissipated in order to achieve a desired level of battery performance Heat exchanger plates, often referred to as "cold plates," may be used for dissipating the heat.

SUMMARY

A method according to an exemplary aspect of the present disclosure includes, among other things, supporting a heat exchanger plate of a battery pack against deflection during an assembly process.

In a further non-limiting embodiment of the foregoing method, the heat exchanger plate is maintained substantially flat during the assembly process.

In a further non-limiting embodiment of either of the foregoing methods, supporting the heat exchanger plate includes positioning a tray of the battery pack against a rigid workstation and positioning the heat exchanger plate against the tray.

In a further non-limiting embodiment of any of the foregoing methods, the rigid workstation includes a convex surface in contact with a bottom of the tray.

In a further non-limiting embodiment of any of the foregoing methods, the convex surface contacts the bottom of the tray near a center of the tray.

In a further non-limiting embodiment of any of the foregoing methods, supporting the heat exchanger plate includes positioning a tray of the battery pack against a rigid workstation, positioning a structural material such as a foam block within the tray, and positioning the heat exchanger plate within the tray such that the foam block is between the tray and the heat exchanger plate.

In a further non-limiting embodiment of any of the foregoing methods, rigidly supporting the heat exchanger plate includes positioning a foam block within a tray of the battery pack, and positioning the heat exchanger plate within the tray such that the foam block is between the tray and the heat exchanger plate.

In a further non-limiting embodiment of any of the foregoing methods, the foam block is constructed of an expanded polymer-based material.

In a further non-limiting embodiment of any of the foregoing methods, the method includes applying a plurality of bead lines of a thermal interface material on the heat exchanger plate, and positioning a battery array against the plurality of bead lines. Moving the battery array into the plurality of bead lines spreads the thermal interface material between the battery array and the heat exchanger plate.

In a further non-limiting embodiment of any of the foregoing methods, applying the plurality of bead lines and moving the battery array into the plurality of bead lines occurs after supporting the heat exchanger plate of the battery pack.

In a further non-limiting embodiment of any of the foregoing methods, the method includes curing the thermal interface material subsequent to moving the battery array into the plurality of bead lines.

In a further non-limiting embodiment of any of the foregoing methods, the heat exchanger plate is substantially rigidly supported during the assembly process.

A battery pack according to another exemplary aspect of the present disclosure includes, among other things, a tray, a structural material positioned against the tray, a heat exchanger plate positioned against the structural material, a thermal interface material disposed on the heat exchanger plate, and a battery array positioned against the thermal interface material.

In a further non-limiting embodiment of the foregoing battery pack, the structural material is configured to maintain the heat exchanger plate in a substantially flat configuration relative to the battery array.

In a further non-limiting embodiment of either of the foregoing battery packs, the structural material is a foam block constructed of an expanded polymer-based material.

In a further non-limiting embodiment of any of the foregoing battery packs, a component of the battery is in direct contact with the thermal interface material.

In a further non-limiting embodiment of any of the foregoing battery packs, the thermal interface material is a compliant and viscous material in an uncured state.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack assembly process may include supporting one or more components, such as a heat exchanger plate, of the battery pack against deflection during the assembly process. Supporting the heat exchanger plate to keep the plate flat during the battery pack assembly process improves the flow distribution of a thermal interface material (TIM), thereby achieving improved TIM coverage and improved heat transfer between battery cells and the heat exchanger plate of the battery pack. These and other features are discussed in greater detail in the following paragraphs of this detailed description.

Figure 1:
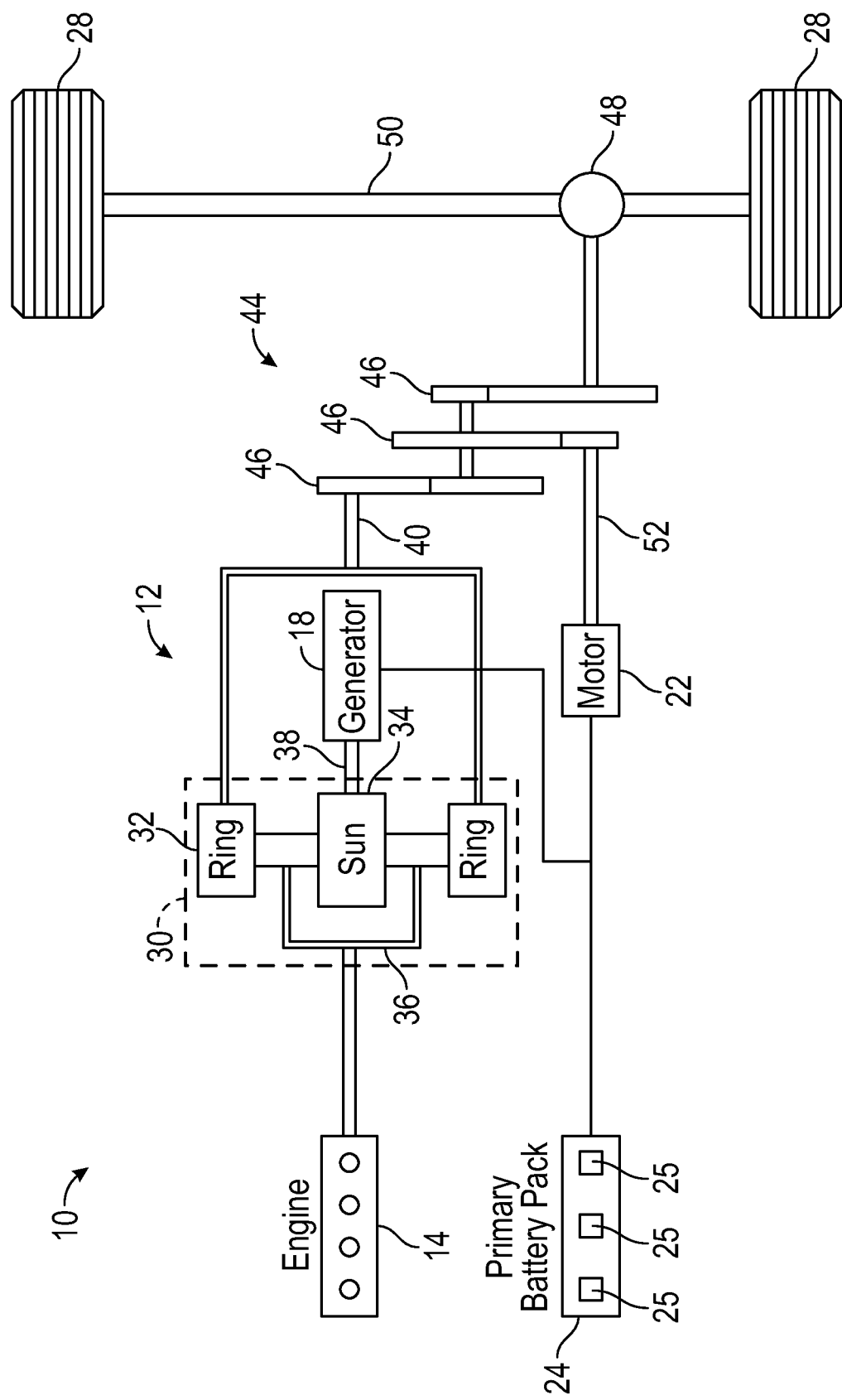
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system may include a combination of an engine 14 and a generator 18 (i.e., a first electric machine). The second drive system may include at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle traction battery. The battery pack 24 may be a high voltage traction battery that includes a plurality of battery arrays 25 (i.e., battery assemblies or groupings of battery cells) capable of outputting electrical power to operate the motor 22 and/or other electrical loads of the electrified vehicle 12 and are capable of receiving power from the generator 18. Other types of energy storage devices and/or output devices could also be used to electrically power the electrified vehicle 12, including low voltage batteries.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
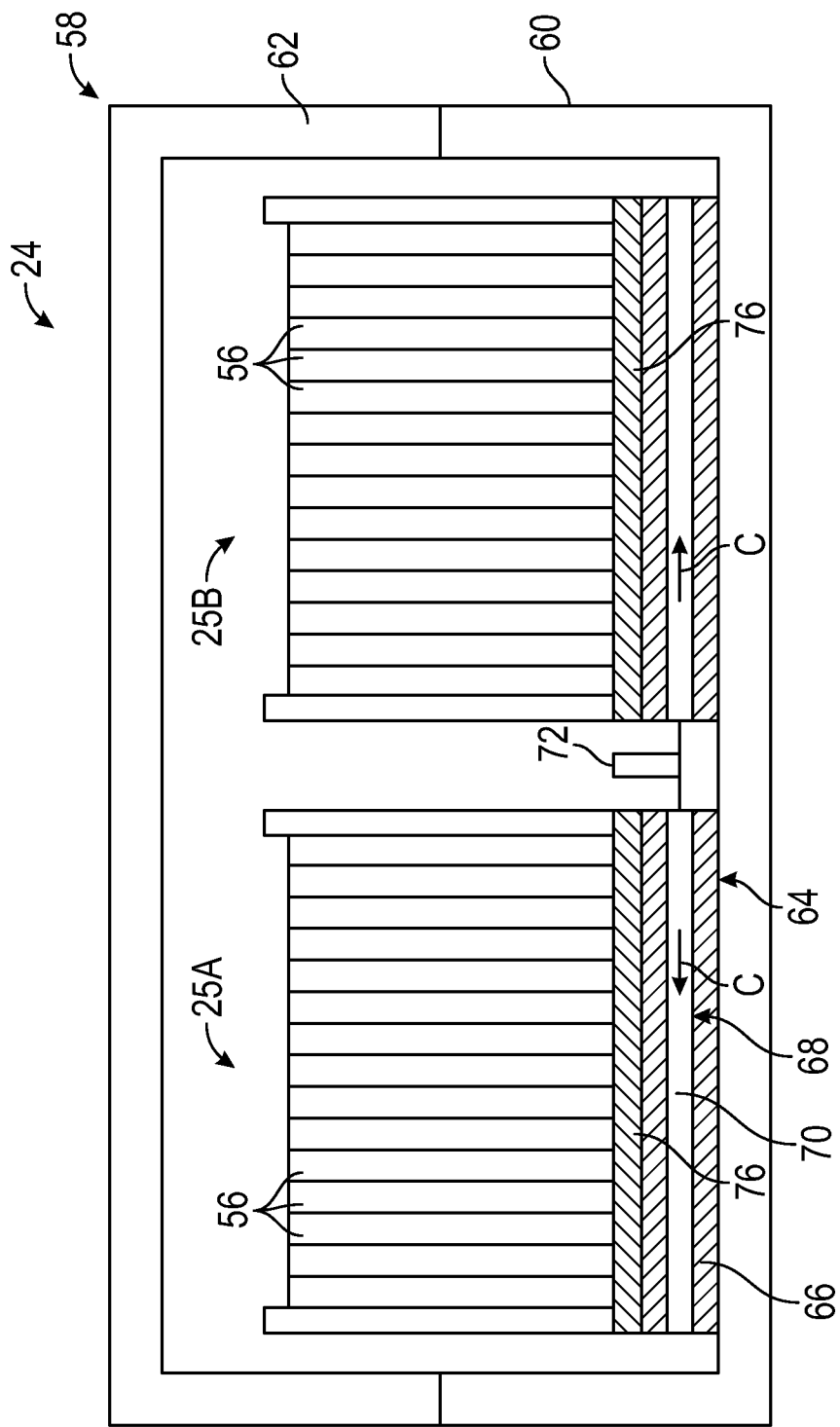
FIG. 2 illustrates a battery pack for an electrified vehicle.
Figure 3:
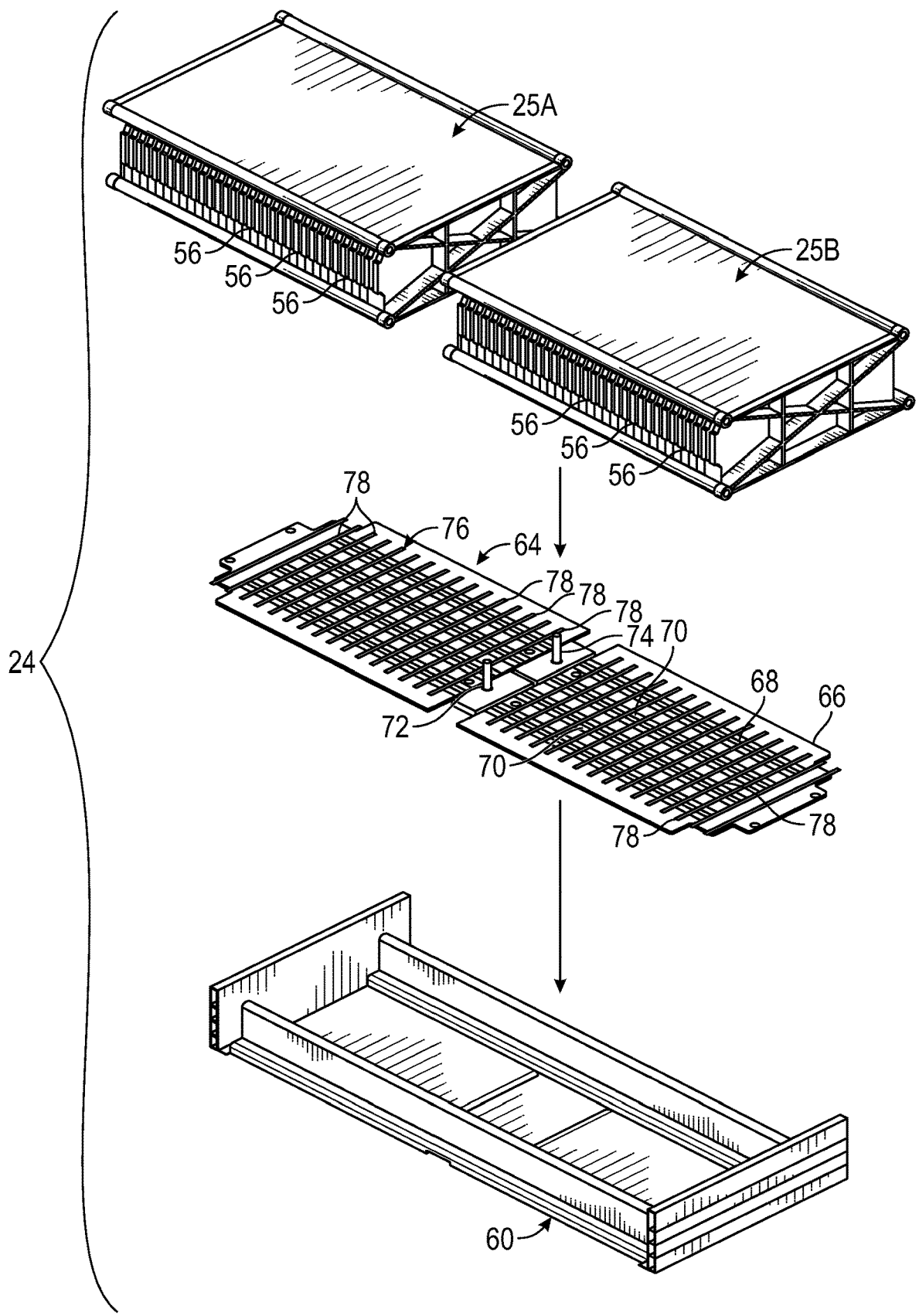
FIG. 3 is an exploded view of the battery pack of FIG. 2.

FIGS. 2 and 3 schematically depict a battery pack 24 that can be employed within an electrified vehicle. For example, the battery pack 24 could be part of the powertrain 10 of the electrified vehicle 12 of FIG. 1. FIG. 2 is a cross-sectional view of the battery pack 24, and FIG. 3 is an exploded view of the battery pack 24 (without cover 62).

The battery pack 24 houses a plurality of battery cells 56 that store energy for powering various electrical loads of the electrified vehicle 12. The battery pack 24 could employ any number of battery cells 56 within the scope of this disclosure. Therefore, this disclosure is not limited to the exact configuration shown in FIGS. 2-3.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array. The battery pack 24 depicted in FIG. 2 includes a first battery array 25A and a second battery array 25B that is positioned adjacent to the first battery array 25A. Although the battery pack 24 of FIG. 2 is depicted as having two battery arrays, the battery pack 24 could include a greater or fewer number of battery arrays within the scope of this disclosure. In addition, the battery arrays 25A, 25B are shown as being positioned end-to-end. However, the battery arrays 25A, 25B could alternatively be positioned side-by-side or in any other configuration relative to one another. Unless stated otherwise herein, when used without any alphabetic identifier immediately following the reference numeral, reference numeral "25" may refer to either battery array 25A or battery array 25B.

An enclosure assembly 58 houses each battery array 25 of the battery pack 24. In an embodiment, the enclosure assembly 58 is a sealed enclosure that includes a tray 60 and a cover 62 that is secured to the tray 60 to enclose and seal each battery array 25 of the battery pack 24. In another embodiment, the battery arrays 25 are positioned within the tray 60 of the enclosure assembly 58, and the cover 62 may then be received over the battery arrays 25. The enclosure assembly 58 may include any size, shape, and configuration within the scope of this disclosure.

Each battery array 25 of the battery pack 24 may be positioned relative to a heat exchanger plate 64, sometimes referred to as a cold plate, such that the battery cells 56 are in close proximity to the heat exchanger plate 64. In an embodiment, the battery arrays 25A, 25B share a common heat exchanger plate 64. However, the battery pack 24 could employ multiple heat exchanger plates within the scope of this disclosure.

The heat exchanger plate 64 may be part of a liquid cooling system that is associated with the battery pack 24 and is configured for thermally managing the battery cells 56 of each battery array 25. For example, heat may be generated and released by the battery cells 56 during charging operations, discharging operations, extreme ambient conditions, or other conditions. It may be desirable to dissipate the heat from the battery pack 24 to improve capacity, life, and performance of the battery cells 56. The heat exchanger plate 64 may be configured to conduct the heat out of the battery cells 56. For example, the heat exchanger plate 64 may function as a heat sink for removing heat from the heat sources (i.e., the battery cells 56). The heat exchanger plate 64 could alternatively be employed to heat the battery cells 56, such as during extremely cold ambient conditions, for example. Although shown as a separate component from the tray 60, the heat exchanger plate 64 could be integrated with the tray 60 as a single component.

The heat exchanger plate 64 may include a plate body 66 and a coolant circuit 68 formed inside the plate body 66. The coolant circuit 68 may include one or more passageways 70 that extend inside the plate body 66. In an embodiment, the passageways 70 establish a meandering path of the coolant circuit 68.

A coolant C may be selectively circulated through the passageways 70 of the coolant circuit 68 to thermally condition the battery cells 56 of the battery pack 24. The coolant C may enter the coolant circuit 68 through an inlet 72 and may exit from the coolant circuit 68 through an outlet 74 (see FIG. 3). The inlet 72 and the outlet 74 may be in fluid communication with a coolant source (not shown). The coolant source could be part of a main cooling system of the electrified vehicle 12 or could be a dedicated coolant source of the battery pack 24. Although not shown, the coolant C may pass through a heat exchanger before entering the inlet 72.

In an embodiment, the coolant C is a conventional type of coolant mixture, such as water mixed with ethylene glycol. However, other coolants, including gases, are also contemplated within the scope of this disclosure.

In use, heat from the battery cells 56 is conducted into the plate body 66 of the heat exchanger plate 64 and then into the coolant C as the coolant C is communicated through the coolant circuit 68. The heat may therefore be carried away from the battery cells 56 by the coolant C.

In an embodiment, the heat exchanger plate 64 is an extruded part. In another embodiment, the heat exchanger plate 64 is made of aluminum. However, other manufacturing techniques and materials are also contemplated within the scope of this disclosure.

A thermal interface material (TIM) 76 may be positioned between the battery arrays 25 and the heat exchanger plate 64 such that exposed surfaces of the battery cells 56 are in direct contact with the TIM 76. In an embodiment, downwardly facing bottom surfaces of the battery cells 56 are in direct contact with the TIM 76. In another embodiment, thermal fins that are positioned between adjacent battery cells 56 of the battery arrays 25 are in direct contact with the TIM 76. The TIM 76 maintains thermal contact between the battery cells 56 and the heat exchanger plate 64 and increases the thermal conductivity between these neighboring components during heat transfer events.

In an embodiment, the TIM 76 includes an epoxy resin. In another embodiment, the TIM 76 includes a silicone based material. Other materials, including thermal greases, may alternatively or additionally make up the TIM 76.

Referring now primarily to FIG. 3, a plurality of bead lines 78 may be applied on the heat exchanger plate 64 during assembly of the battery pack 24. Once cured, the bead lines 78 establish the TIM 76 between the battery cells 56 of the battery arrays 25 and the heat exchanger plate 64. As the battery arrays 25 are moved (i.e., pushed down) onto the bead lines 78 or the bead lines 78 are moved (i.e., pushed up) into the battery arrays 25 during the assembly process, the bead lines 78 attempt to spread-out or distribute themselves evenly between the battery arrays 25 and the heat exchanger plate 64. Prior to curing, the beads lines 78 are generally viscous and compliant; however, the bead lines 78 also exhibit some degree of resilience and therefore may provide a resistance force to the distribution of the TIM 76. The resistance force may be transmitted to the heat exchanger plate 64 and cause the heat exchanger plate 64 to deflect downwardly (i.e., toward the tray 60) during assembly. Deflection of the heat exchanger plate 64 may result in poor distribution of the bead lines 78, thereby reducing the thermal effectiveness of the TIM 76.

It is therefore desirable to substantially eliminate the deflection of the heat exchanger plate 64 during the battery pack assembly process in order to maximize the spreading distribution of the TIM 76. Exemplary techniques for substantially eliminating deflection of the heat exchanger plate 64 during the assembly process are further discussed below.

Figure 4:
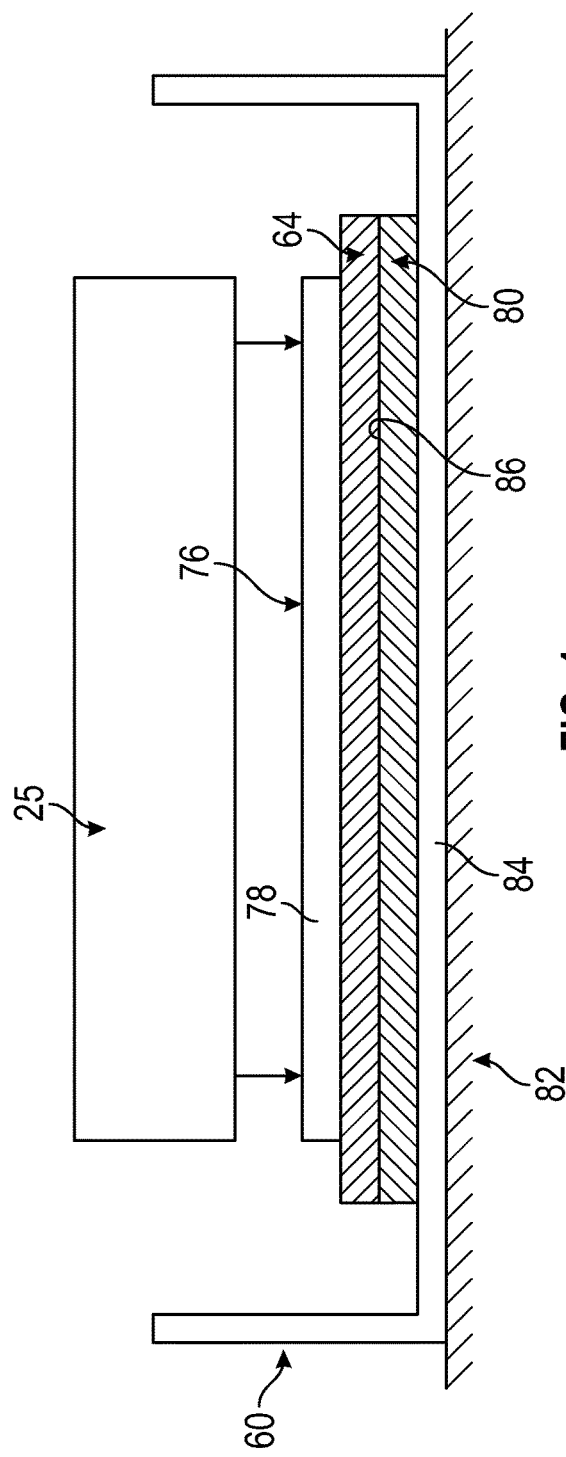
FIG. 4 schematically illustrates a battery pack assembly process according to a first embodiment of this disclosure.

FIG. 4, with continued reference to FIGS. 1-2, schematically illustrates an exemplary battery pack assembly process according to a first embodiment of this disclosure. The heat exchanger plate 64 may be maintained substantially flat (i.e., little to no bending) during the assembly process in order to prevent its deflection and maximize coverage of the TIM 76. In an embodiment, a combination of supporting the tray 60 and incorporating a foam block 80 (i.e., a structural material) into the battery pack 24 substantially eliminates deflection of the heat exchanger plate 64.

For example, the tray 60 may be positioned against a rigid workstation 82. The workstation 82 supports a bottom 84 of the tray 60. In an embodiment, the workstation 82 substantially rigidly supports the bottom 84 of the tray 60. In this disclosure, the phrase "substantially rigidly supports" means that deflection of the tray 60 and/or heat exchanger plate 64 is reduced by at least 50% during the assembly process compared to a tray/heat exchanger plate that is not substantially rigidly supported during the assembly process.

The foam block 80 may then be positioned within the tray 60 followed by the heat exchanger plate 64. The foam block 80 may therefore be positioned between the tray 60 and the heat exchanger plate 64 and substantially rigidly supports a bottom 86 of the heat exchanger plate 64.

The combination of the rigid workstation 82 and the relatively stiff foam block 80 maintains the heat exchanger plate 64 flat during the subsequent assembly steps in which the battery array(s) 25 are positioned within the tray 60 and moved into contact with the bead lines 78 of the TIM 76. Coverage of the TIM 76 relative to the heat exchanger plate 64 can therefore be maximized. In another embodiment, the foam block 80 or the rigid workstation 82 can be utilized alone to rigidly support the heat exchanger plate 64 during the assembly process.

The foam block 80 may be constructed of an expanded polymer-based material. Exemplary expanded polymer-based materials can include, but are not limited to, expanded polypropylene, expanded polystyrene, and expanded polyethylene. Generally, these polymer-based materials are considered relatively structural and stiff foamed polymer-based materials. By considering the design space that is available, the density of the foam block 80 may be chosen such that it offers the required stiffness for maintaining flatness of the heat exchanger plate 64 during assembly.

In an embodiment, the foam block 80 is maintained within (i.e., not removed from) the battery pack 24 after positioning the battery arrays 25. The foam block 80 is therefore an integral structural component of the battery pack 24 upon completion of the battery pack assembly process.

Figure 5:
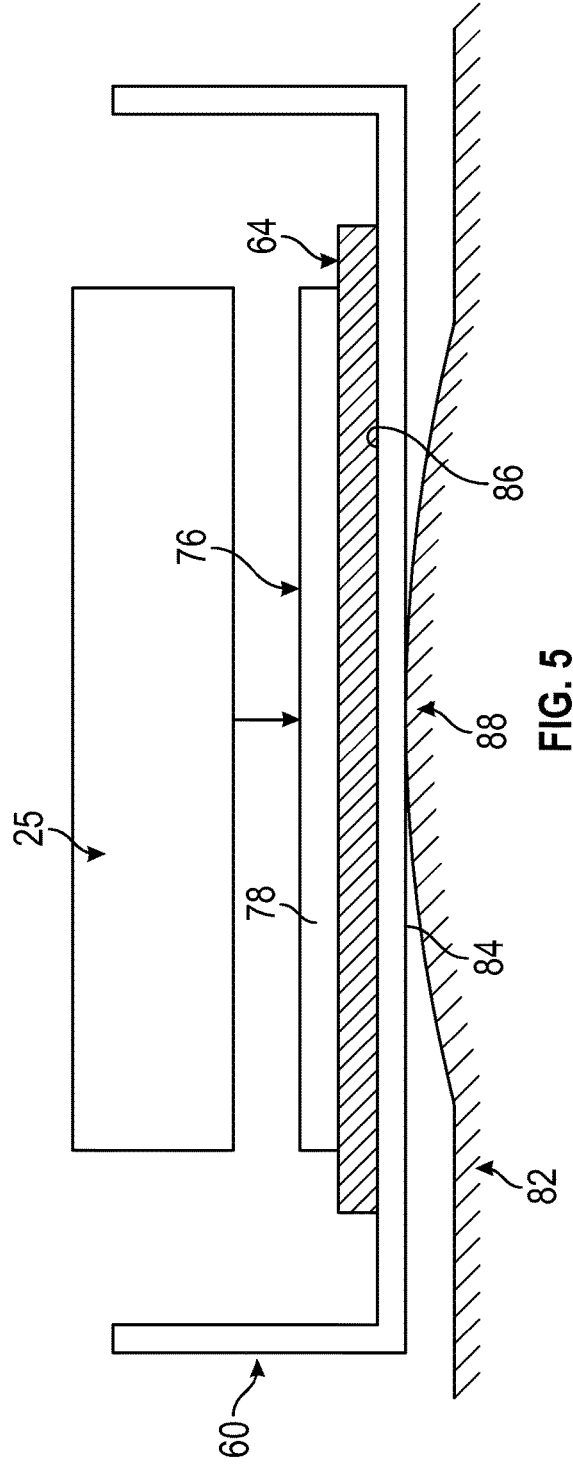
FIG. 5 schematically illustrates a battery pack assembly process according to a second embodiment of this disclosure.

FIG. 5 schematically illustrates another exemplary battery pack assembly process. In this embodiment, the tray 60 may be positioned against a rigid workstation 82 during the assembly process. The workstation 82 substantially rigidly supports the bottom 84 of the tray 60. In an embodiment, the workstation 82 includes a protruding surface 88. The protruding surface 88 may be a convex surface, in an embodiment. The protruding surface 88 may be loaded against the tray 60 to force the tray 60 into the heat exchanger plate 64 near a center of the heat exchanger plate 64 as the heat exchanger plate 64 is positioned within the tray 60. The protruding surface 88 maintains the heat exchanger plate 64 flat during the subsequent assembly steps in which the battery array(s) 25 are positioned within the tray 60 and moved into contact with the bead lines 78 of the TIM 76. Coverage of the TIM 76 relative to the heat exchanger plate 64 can therefore be maximized Although not shown, the foam block 80 could additionally be used to rigidly support the heat exchanger plate 64 in combination with the protruding surface 88 during the battery pack assembly process of FIG. 5.

Figure 6A:
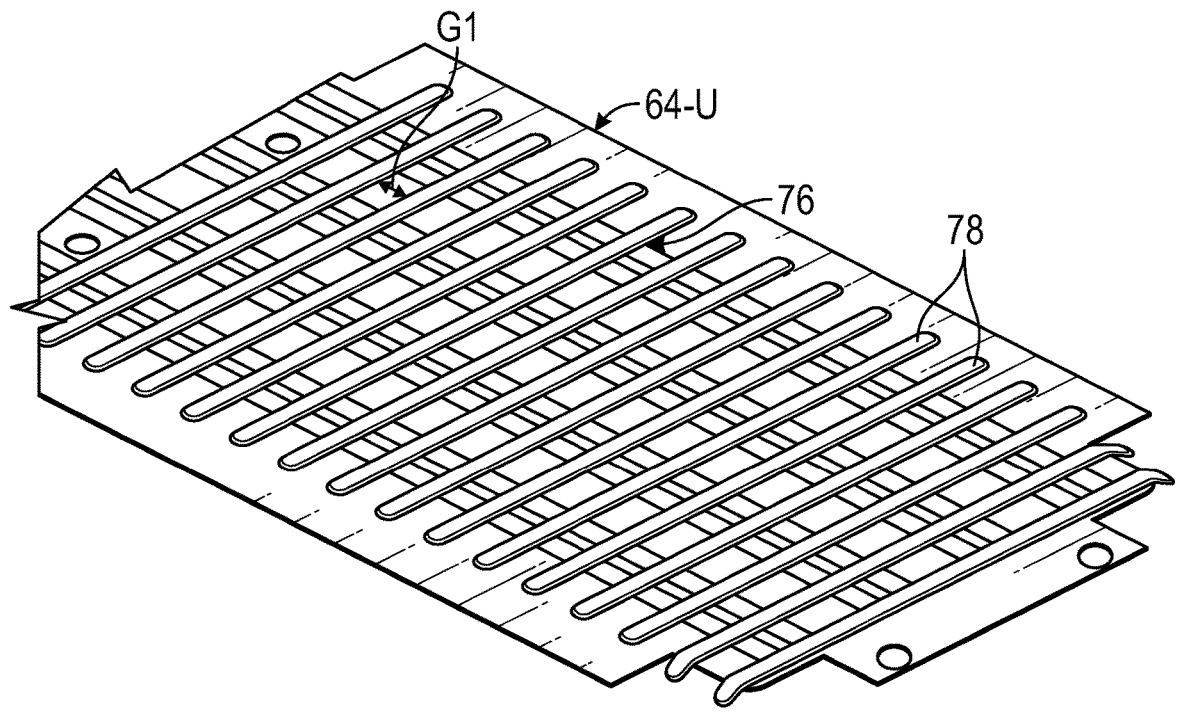
FIGS. 6A and 6B illustrate a comparison of thermal interface material (TIM) coverage for an unsupported and a supported heat exchanger plate, respectively.
Figure 6B:
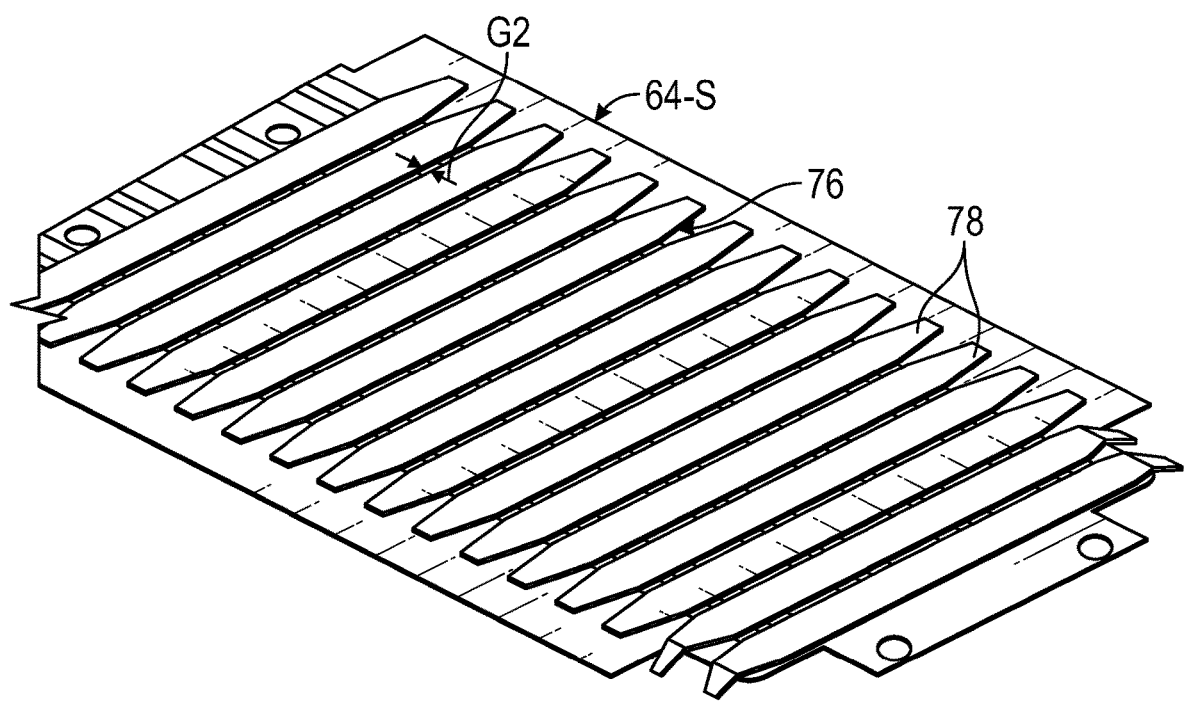

FIGS. 6A and 6B illustrate a side-by-side comparison of the TIM 76 coverage for a heat exchanger plate 64-U that was unsupported during the battery pack assembly process (FIG. 6A) and for a heat exchanger plate 64-S that was supported (such as in the manner shown in FIG. 4 or 5) during the battery pack assembly process (FIG. 6B). The unsupported heat exchanger plate 64-U exhibits relatively poor distribution and coverage of the TIM 76 as evidenced by the relatively large gaps G1 that extend between adjacent bead lines 78 of the TIM 76. In contrast, the supported heat exchanger plate 64-S exhibits significantly improved distribution and coverage of the TIM 76 as evidenced by the reduced gaps G2 between the adjacent bead lines 78 of the TIM 76. In an embodiment, the TIM 76 coverage for the supported heat exchanger plate 64-S is up to 40% higher than the unsupported heat exchanger plate 64-U.

The electrified vehicle battery pack designs of this disclosure utilize one or more stiff materials to provide a distributed response load from the workstation surface, to the battery pack tray, and then to the battery pack heat exchanger plate in order to promote a more complete flow distribution of the liquid TIM. The thermal effectiveness of the TIM is thereby improved during the life of the battery pack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a tray;
   a structural material positioned against the tray;
   a heat exchanger plate positioned against the structural material;
   a thermal interface material disposed on the heat exchanger plate; and
   a battery array positioned against the thermal interface material,
   wherein the structural material is configured to maintain the heat exchanger plate in a flat configuration relative to the battery array.

2. The battery pack as recited in claim 1, wherein the structural material is a foam block constructed of an expanded polymer-based material.

3. The battery pack as recited in claim 2, wherein the expanded polymer-based material includes an expanded polypropylene.

4. The battery pack as recited in claim 2, wherein the expanded polymer-based material includes an expanded polystyrene.

5. The battery pack as recited in claim 2, wherein the expanded polymer-based material includes an expanded polyethylene.

6. The battery pack as recited in claim 1, wherein a component of the battery array is in direct contact with the thermal interface material.

7. The battery pack as recited in claim 6, wherein the component is a battery cell.

8. The battery pack as recited in claim 1, wherein the thermal interface material is a compliant and viscous material in an uncured state.

9. The battery pack as recited in claim 8, wherein the thermal interface material includes a plurality of bead lines disposed on the heat exchanger plate.

10. The battery pack as recited in claim 9, wherein the plurality of bead lines are elongated and extend across a majority of a width of the heat exchanger plate.

11. A battery pack, comprising:
a tray;
a structural material positioned against the tray;
a heat exchanger plate positioned against the structural material;
a thermal interface material disposed on the heat exchanger plate; and
a battery array positioned against the thermal interface material,
wherein a density of the structural material is configured to include a stiffness that is sufficient to maintain the heat exchanger plate in a flat configuration relative to the battery array.

12. The battery pack as recited in claim 1, wherein the heat exchanger plate includes a plate body and a coolant circuit formed inside the plate body.

13. The battery pack as recited in claim 12, wherein the coolant circuit includes one or more passageways arranged to establish a meandering path inside the plate body.

14. The battery pack as recited in claim 1, comprising a second battery array positioned against the thermal interface material, wherein the heat exchanger plate is configured to thermally manage battery cells of both the battery array and the second battery array.

15. A battery pack, comprising:
a tray;
a structural material positioned against the tray,
wherein the structural material is a foam block constructed of an expanded polymer-based material;
a heat exchanger plate positioned against the structural material;
a thermal interface material including a plurality of bead lines disposed on the heat exchanger plate,
wherein each of the plurality of bead lines is elongated and extends across a majority of a width of the heat exchanger plate; and
a battery array positioned against the thermal interface material.

16. The battery pack as recited in claim 15, wherein the tray is received against a rigid workstation as the foam block is positioned against the tray.

17. The battery pack as recited in claim 15, wherein the structural material is configured to maintain the heat exchanger plate in a flat configuration relative to the battery array such that each of the plurality of bead lines is evenly distributed across the majority of the width of the heat exchanger plate.

* * * * *